(12) United States Patent
Leeb et al.

(10) Patent No.: US 10,436,579 B2
(45) Date of Patent: Oct. 8, 2019

(54) BENDING ANGLE MEASURING METHOD

(71) Applicant: TRUMPF Maschinen Austria GmbH & Co. KG, Pasching (AT)

(72) Inventors: Sebastian Leeb, Linz (AT); Stefan Lustig, Linz (AT)

(73) Assignee: TRUMPF Maschinen Austria GmbH & Co. KG., Pasching (AT)

( * ) Notice: Subject to any disclaimer, the term of this patent is extended or adjusted under 35 U.S.C. 154(b) by 278 days.

(21) Appl. No.: 15/519,187

(22) PCT Filed: Oct. 16, 2015

(86) PCT No.: PCT/AT2015/050257
§ 371 (c)(1),
(2) Date: Apr. 27, 2017

(87) PCT Pub. No.: WO2016/058020
PCT Pub. Date: Apr. 21, 2016

(65) Prior Publication Data
US 2017/0241775 A1    Aug. 24, 2017

(30) Foreign Application Priority Data

Oct. 16, 2014  (AT) ................. A50744/2014

(51) Int. Cl.
*G01B 11/26* (2006.01)
*B21D 5/00* (2006.01)
*B21D 5/02* (2006.01)

(52) U.S. Cl.
CPC ............ *G01B 11/26* (2013.01); *B21D 5/006* (2013.01); *B21D 5/02* (2013.01)

(58) Field of Classification Search
CPC ........ G01B 11/26; B21D 5/02; B21D 5/0209; B21D 5/006
See application file for complete search history.

(56) References Cited

U.S. PATENT DOCUMENTS

| 5,329,597 A | 7/1994 | Kouno et al. |
| 5,531,087 A | 7/1996 | Kitabayashi et al. |

(Continued)

FOREIGN PATENT DOCUMENTS

| CN | 103575238 A | 2/2014 |
| DE | 44 93 589 T1 | 5/1996 |

(Continued)

OTHER PUBLICATIONS

International Search Report of PCT/AT2015/050257, dated Feb. 9, 2016.

(Continued)

*Primary Examiner* — Teresa M Ekiert
(74) *Attorney, Agent, or Firm* — Collard & Roe, P.C.

(57) ABSTRACT

The invention relates to a bending angle measuring method for a bending machine (1), in particular a bending press or brake press, and the bending machine (1) has a bending tool arrangement (2) with at least one upper (3) and lower tool (4). A sheet to be formed (5) is placed in the bending tool arrangement (2). A light pattern (13) is emitted onto a section by means of a lighting device (11) of a bending angle measuring device (7), the section being a single part and surrounding a sub-region on a lateral surface of the lower tool (4) and of the sheet (5) placed in the bending tool arrangement. The light pattern (13) on the lower tool (4) and on the sheet (5) is detected by an image detecting device (10) of the bending angle measuring device (7), and a bending angle is ascertained from detected light pattern (13) by an analysis module. Furthermore, a transition portion (9) between the lower tool (4) and the sheet (5) is ascertained and, based thereon, a sub-detection region (19) in the detection range (8) of the image detecting device (10) is ascertained. The sub-detection region (19) is detected by the image detecting device (10) and the currently produced bending angle is ascertained while carrying out the bending process.

7 Claims, 3 Drawing Sheets

(56) References Cited

U.S. PATENT DOCUMENTS

Figure 1:
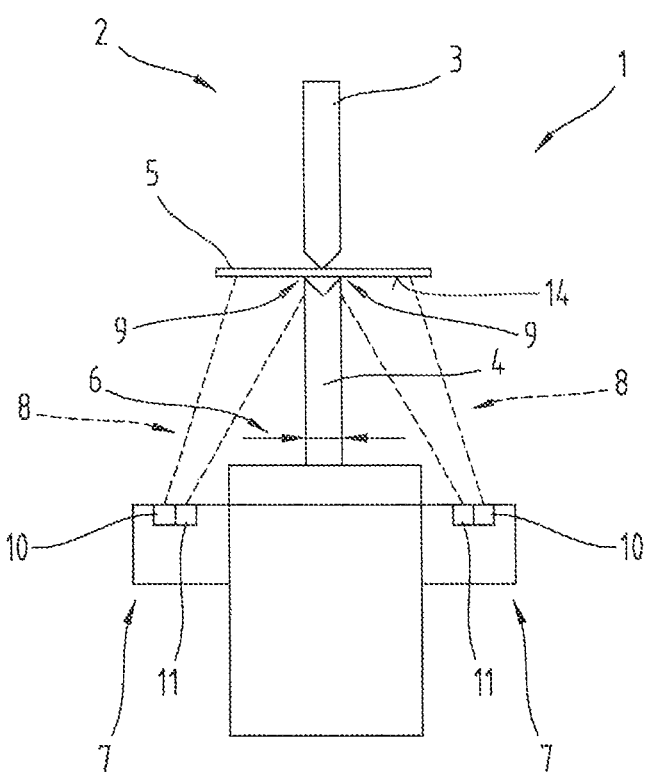

| | | | |
|---|---|---|---|
| 5,661,671 A | 8/1997 | Ooenoki et al. |
| 6,473,537 B1 | 10/2002 | Yamada |
| 6,727,986 B1 | 4/2004 | Serruys |
| 2013/0291610 A1 | 11/2013 | Nardetto et al. |

FOREIGN PATENT DOCUMENTS

| | | |
|---|---|---|
| DE | 691 25 986 T2 | 8/1997 |
| DE | 199 30 745 A1 | 1/2000 |
| DE | 100 09 074 A1 | 9/2001 |
| DE | 10 2007 056 827 B3 | 6/2009 |
| DE | 20 2010 006 391 U1 | 11/2010 |
| EP | 1 102 032 A1 | 5/2001 |
| EP | 1 204 845 B1 | 4/2005 |
| JP | H03-245008 A | 10/1991 |
| JP | H07-239221 A | 9/1995 |
| JP | H11-104741 A | 4/1999 |
| JP | 2014-012285 A | 1/2014 |
| WO | 2001/014826 A1 | 3/2001 |
| WO | 2010/053428 A1 | 5/2010 |

OTHER PUBLICATIONS

Response to European Patent Office by Austrian Patent Attorney in PCT/AT2015/050257, dated Sep. 16, 2016, with English translation of relevant parts.

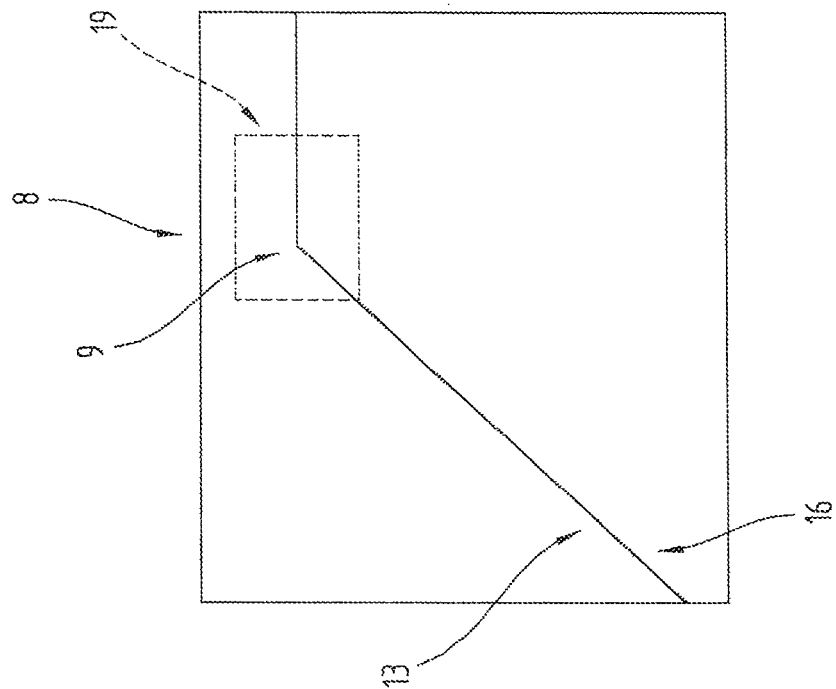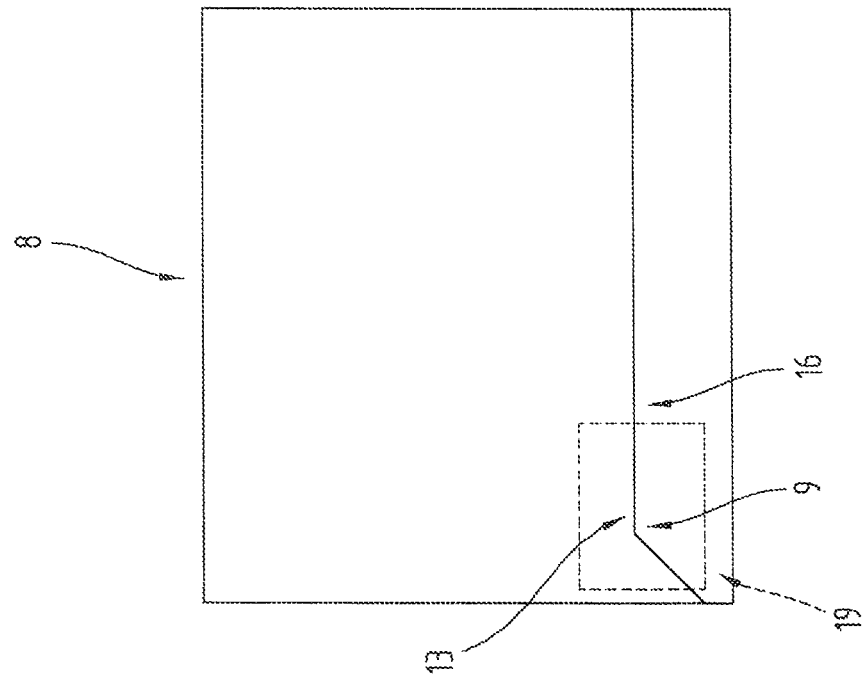

BENDING ANGLE MEASURING METHOD

CROSS REFERENCE TO RELATED APPLICATIONS

This application is the National Stage of PCT/AT2015/050257 filed on Oct. 16, 2015, which claims priority under 35 U.S.C. § 119 of Austrian Application No. A50744/2014 filed on Oct. 16, 2104, the disclosure of which is incorporated by reference. The international application under PCT article 21(2) was not published in English.

The invention relates to a method for measuring bending angles on a bending machine.

Optical methods for measuring bending angles are usually based on a system whereby a light pattern is directed onto the metal sheet to be formed by means of a lighting device of a bending angle measuring device and this light pattern is detected by an image detecting device of the bending angle measuring device. The image detecting device and lighting device are usually disposed at a distance apart from one another so that an angle is formed between the light beam hitting the metal sheet and the main detection direction of the image detecting device. This spacing and the angle obtained as a result ensure that the image detecting device detects the light pattern projected onto the sheet metal surface at an angle so that there is a clear change in the geometry of the light pattern projected onto the leg of the metal sheet as it is being bent during implementation of the bending operation.

In order to ensure that the bending angle set by means of an optical method of this type is detected as accurately as possible, it is of particular advantage if detection of the projected light pattern takes place as close to the bending edge on the lower tool as possible. This being the case, the bending angle measuring device is disposed at a right angle to the longitudinal extension of the lower tool at a distance therefrom and the lighting device and image detecting device are pivoted in the direction of the bending edge of the lower tool. Such an arrangement is known from DE 20 2010 00 63 91 U1, for example. However, the disadvantage of this set-up is that the orientation of the bending angle measuring device is usually correct for only one lower tool or for a few of the lower tools. The problem in particular is that the point of transition from the lower tool to the sheet can shift out of the detection range of the image detecting device due to the width of the lower tools. However, this point generally corresponds to the bending edge and in any case constitutes the region that it is of interest to detect. If using lower tools of differing widths, it is therefore often necessary to pivot the bending angle measuring device again.

DE 199 30 745 A1, for example, also discloses a bending press on which the image detecting device is pivoted in order to obtain a better resolution.

DE 10 2007 056 827 B3 discloses a device comprising one or more bending angle measuring devices which are positioned relative to the lower tool on the basis of construction data and/or material data. In order to cater for different tool widths, the measuring devices are moved on guide rails disposed at a right angle to the longitudinal extension of the lower tool.

Similar systems are also known from EP 1 204 845 A1, EP 1 102 032 A1 and U.S. Pat. No. 5,531,087 A.

The disadvantage of the prior art resides in the fact that in order to adapt the bending angle measurement to different lower tools, the orientation of the bending angle measuring device relative to the lower tool has to be changed when pivoted. However, in making such a change, there is always a risk that the calibration or referencing of the bending angle measuring device relative to the lower tool may also be unintentionally changed as a result, thereby risking a false measurement of the bending angle.

Accordingly, the objective of the invention is to propose a bending angle measuring method which can be used for a number of lower tools of differing widths, whereby the problems of maladjustment when adapting to different lower tools are prevented.

The objective of the invention is achieved by means of a bending angle measuring method for a bending machine. In particular, the bending machine is a bending press or brake press and the bending machine has a bending tool arrangement with at least one upper and lower tool. In order to run the bending operation, a sheet to be formed is placed in the bending tool arrangement. A light pattern is emitted onto a section by means of a lighting device of a bending angle measuring device, said section being a single part and surrounding a sub-region on a lateral surface of the lower tool and the positioned sheet. The light pattern on the lower tool and on the sheet is detected by an image detecting device of the bending angle measuring device and a bending angle is ascertained from the detected light pattern by an analysis module. A transition portion between the lower tool and the sheet is ascertained and, based on the transition portion, a sub-detection region in the detection range of the image detecting device is also ascertained. The sub-detection region is then detected by the image detecting device, and the currently produced bending angle is ascertained while carrying out the bending process.

The proposed method can be used for both bending presses and brake presses. Further details of the specific design details of these two types of bending machines will not be given here. By bending tool arrangement is meant those elements of the bending machine directly involved in implementing the bending process on the sheet. Generally speaking, one tool of the bending tool arrangement remains stationary relative to the bending machine and one tool is driven by a drive means when the bending process is implemented. With regard to the bending tool arrangement of a bending press, the stationary tool is referred to as the lower tool.

The single-part section that is illuminated is that region in which the light pattern is emitted by the lighting device. This region is such that the light pattern extends across the lower tool and the sheet but in particular across the transition from the lower tool to the sheet.

This set-up ensures that the bending angle can be correctly and accurately detected for a number of possible bending tool arrangements using only one image detecting device and in particular without having to pivot it.

Based on another embodiment, the transition portion is determined on the basis of the detected light pattern. The advantage of this embodiment is that the proposed method can be used for every bending machine and can be so in particular regardless of whether the tool geometry being used is known. The outer tool geometry, in particular the transition from the tool body to the sheet, is determined if necessary based on the proposed arrangement.

In this respect, another embodiment is of advantage, whereby a light line is emitted by the lighting device. A light line is distinctive due to a clearly defined geometry in particular and is therefore readily detectable. Furthermore, based on an appropriate choice of high light intensity, a particularly good contrast with the surrounding area can be obtained, thereby improving detectability and hence the reliability of the evaluation.

Based on another embodiment, the transition portion is determined by finding a discontinuity of the geometry in the detected light pattern. The light pattern is configured so that the transition from the lower tool to the sheet leads to a clear and hence readily detectable interruption of the geometry of the light pattern. This analysis is preferably run by the analysis module. If a light line is emitted as the light pattern, as is the case based on another embodiment, the transition can be detected as a kink in the detected image of the straight line.

In the case of another embodiment, the transition portion is determined on the basis of a code of the lower tool that is stored or determined. The advantage of this is that this code can be used to access characteristic data specific to the tool, thereby making the transition portion directly available. For example, the code or the tool characteristic data linked to the code can be stored in a memory means of the machine controller.

Also of advantage is another embodiment whereby a tool code applied to the lower tool is read by the image detecting device. The tool code may be a 1D or 2D code, for example. The tool code may be configured so that a link to the specific tool characteristic data can be established by means of this code. However, it would also be possible for the code itself to contain the tool characteristic data, in which case the transition portion and hence the sub-detection region can be directly ascertained.

Based on another embodiment, the sub-detection region is detected in high resolution. The advantage of this is that having determined the sub-detection region, which is usually significantly smaller than the detection range of the image detecting device, this sub-region can nevertheless be read with sufficient accuracy. It is preferable to use an image detecting device which has a resolution of at least 500 ppi in the sub-detection region. Based on a preferred embodiment, the sub-detection region on the sheet has a physical size of 20×20 mm and this region is detected with 400×400 pixels.

In the case of another embodiment, the sub-detection region is such that the transition portion lies in the peripheral region of the sub-detection region. Since it is that section of the detected light pattern that occurs from the sheet to the transition portion that is of importance in determining the bending angle, the advantage of this embodiment is that a larger area is available for determining the bending angle without having to make the sub-detection region unnecessarily larger.

Based on another embodiment, the bending angle measuring device is pushed along the lower tool. The advantage of this embodiment is that the bending angle measuring device can be positioned in the region of the bending tool arrangement in which the bending angle being created has to be determined. Another advantage resides in the fact that the bending angle measuring device can be moved out of the working area during the process of placing the sheet in the bending tool arrangement. This protects against damage which might otherwise occur whilst manipulating the sheet to be formed. Of particular advantage, however, is that fact that this pushing movement does not change the orientation of the bending angle measuring device relative to the lower tool and transition portion.

The objective of the invention is also achieved by means of a bending machine having a bending angle measuring device, which bending angle measuring device is configured to implement the proposed method. Accordingly, the image detecting device detects the light pattern emitted by the lighting device onto the lower tool and onto the sheet to be formed. Furthermore, the image detecting device is a high-resolution camera with a resolution of at least 500 ppi in the sub-detection region. This guarantees that the entire working area with the different lower tools can be covered using only one image detecting device and can be so without the detection range having to be pivoted.

To provide a clearer understanding, the invention will be described in more detail below with reference to the appended drawings.

Figure 2:
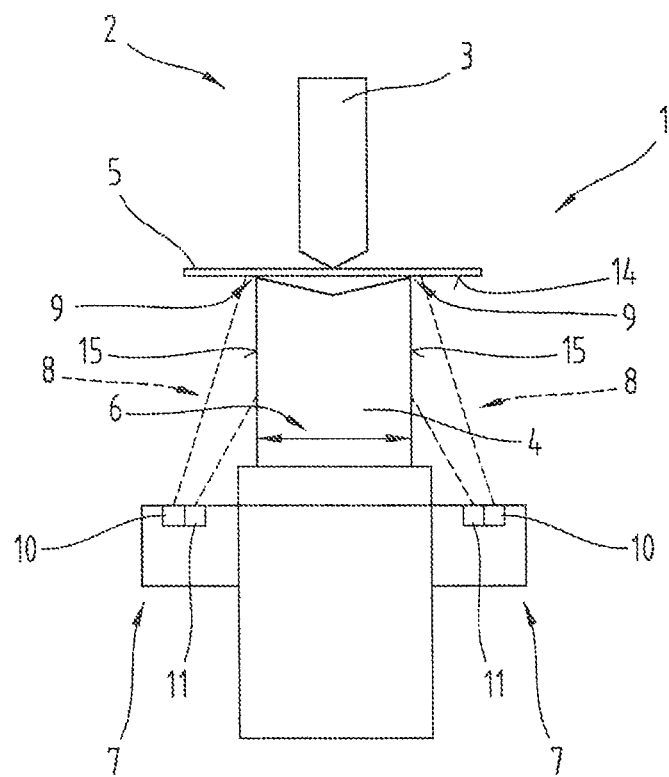
Figure 3:
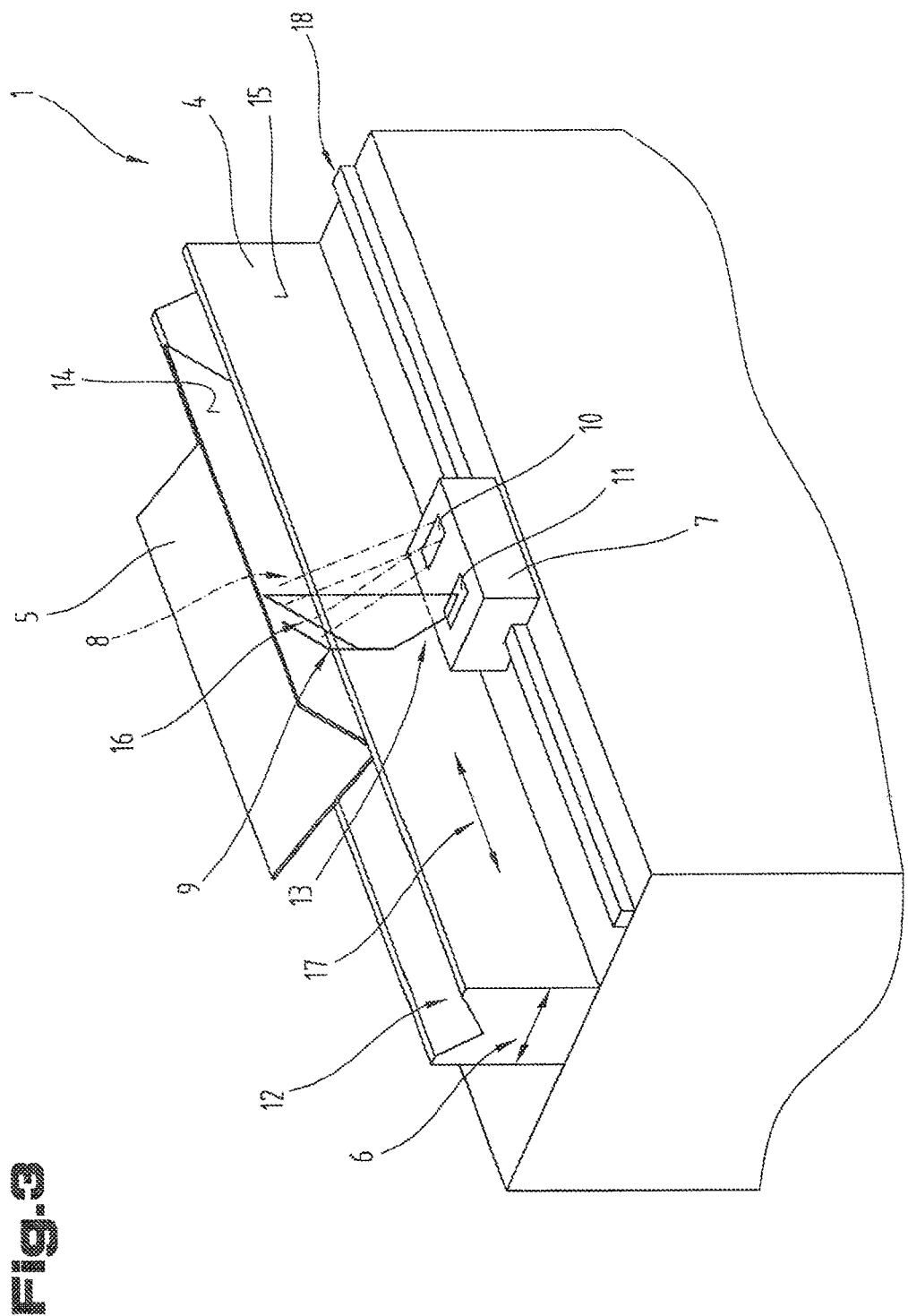

These are highly simplified, schematic diagrams of the following:

FIG. 1 a bending machine with a lower tool of a first width, with a view to illustrating the proposed method;

FIG. 2 a bending machine with a lower tool of a second width, with a view to illustrating the proposed method;

FIG. 3 a perspective diagram of a bending machine, with a view to illustrating the proposed method;

FIG. 4a) and b) determining the sub-detection regions from the total detection range for lower tools of differing widths.

FIG. 1 illustrates part of a bending machine 1 with a bending tool arrangement 2, which bending tool arrangement 2 has at least one upper 3 and lower tool 4. The other components of the bending machine 1, in particular the machine frame and the drive means for moving the bending tool arrangement 2 and thus implementing the bending process, are not illustrated because they are of no relevance to the description of the proposed method.

To prepare for the bending process, a sheet 5 to be formed is placed in the bending tool arrangement 2. In the case illustrated, a lower tool 4 having the smallest possible width 6 is disposed in the bending machine 1, which represents a first extreme situation in terms of orienting the bending angle measuring device 7. The other extreme based on the widest possible lower tool is illustrated and described in FIG. 2.

In this configuration of the bending tool arrangement 2, it is necessary to ensure that the detection range 8 and in any case the transition portion 9 between the lower tool 4 and sheet 5 lies in the detection range 8 of the image detecting device 10. In accordance with the proposed method, the transition portion 9 between the lower tool 4 and sheet 5 is determined and a sub-detection region in the detection range 8 of the image detecting device 10 is determined on the basis of this transition portion 9.

FIGS. 1 and 2 illustrate a simplified form of the lower tool, in particular the transition portion 9. The transition portion 9 is not disposed entirely at the outer edge of the lower tool 4 but rather is slightly offset from the die recess of the tool, as may be seen from FIG. 3. Since the sheet lies along this edge of the die recess during the bending operation, it is important for the bending angle measuring device 7 to be able to detect this transition portion 9 efficiently and in high resolution.

FIG. 2 illustrates the situation in which a lower tool 4 having the largest possible width 6 is being used in the bending tool arrangement 2. Again in this case, the detection range 8 of the image detecting device 10 of the bending angle measuring device 7 is large enough to detect both the lower tool 4 and the sheet 5 disposed in the bending tool arrangement 2, in particular the transition portion 9 between the lower tool 4 and sheet 5.

FIG. 3 is a perspective diagram of the lower tool 4 disposed in the bending machine 1. The lower tool 4 has a V-shaped die recess 12 into which the sheet 5 is pressed by the upper tool. By transmitting this force to the sheet 5, the latter is reshaped so that the sheet 5 is formed to the predefined shape of the recess 12, in particular the opening width of the die recess. In accordance with the proposed method, a light pattern 13 is emitted by a lighting device 11 of the bending angle measuring device 7 onto a section on the bottom face 14 of the sheet 5 and also onto a section on the side wall 15 of the lower tool 4. Based on a preferred embodiment, the light pattern 13 is a light line 16, which light line 16 is clearly visible as a line on the side wall 15 of the lower tool 4 and on the bottom face 14 of the sheet 5.

In accordance with the proposed method, the detection range 8 of the image detecting device 10 is large enough to detect all possible different widths 6 of the lower tool 4 and the light pattern 13 projected onto the lower tool 4 and sheet 5. It is therefore possible to use every lower tool 4 and/or every bending tool arrangement 2 that can be used for this bending machine 1 without having to calibrate the bending angle measuring device 7 to the lower tool 4 currently being used. In particular, therefore, it is not necessary to pivot the bending angle measuring device 7 relative to the lower tool 4 about a longitudinal direction 17 of the lower tool 4. The transition portion 9 relevant to determining the bending angle therefore always lies within the detection range 8.

Based on another embodiment, the bending angle measuring device 7 can be pushed in the longitudinal direction 17 of the lower tool 4. With this additional feature, it is possible to determine the current bending angle at several positions along the sheet 5. This is of particular advantage if a very long sheet is being bent and there is a risk of an uneven bend being formed along the sheet. The pushing movement is achieved due to the fact that the bending angle measuring device 7 can be moved along a guide device 18, for example, and the movement is preferably effected by a drive means.

FIGS. 4a and 4b illustrate how the sub-detection region is formed from the detection range of the image detecting device.

FIG. 4a represents the situation from FIG. 1 and FIG. 4b represents the situation from FIG. 2. FIG. 4 illustrates the total detection range 8 of the image detecting device, which is captured by the image detecting device, for example a CCD camera. A light pattern, preferably a light line, is emitted by the lighting device onto the lower tool and sheet. As may be seen from FIG. 3, there is an offsets between the lighting device 11 and the image detecting device 10 so that the detection range of the image detecting device 10 detects the light line 16 projected onto the sheet 5 at an angle relative to the direction in which the light pattern 13 is projected. Due to this offset and the angled image detection, the transition portion 9 that is of interest for the proposed method can be seen as a kink in the detected light pattern 13, 16. This situation is illustrated in FIGS. 4a and 4b. In the images, the horizontal part of the light line 16 corresponds to the projection of the light line onto the bottom face 14 of the sheet and the rising part of the light line 16 corresponds to the projection of the light pattern onto the side wall 15 of the lower tool 4.

When using a lower tool 4 with a smaller width 6, this transition portion 9 lies at a different point in the detection range 8 than is the case with a wide lower tool.

In accordance with the proposed method, a sub-detection region 19 in the detection range 8 of the image detecting device 10 is created on the basis of the transition portion 9. In order to determine the bending angle correctly and reliably during the bending process, it is important that the region of the sheet that lies as close as possible to the bending edge in the lower tool 4 is clearly detected. In the detected section, this corresponds to the region of the light line 16 directly adjoining the transition portion 9, which in the diagram is the horizontal portion of the light line 16 to the right of the transition portion 9. Since only this region to the right of the transition portion 9 is of interest and the remaining area of the detection range 8 contains no information relevant to determining the bending angle being set, this sub-detection region 19 is formed in such a way that the transition portion 9 and a relevant portion of the light pattern 13 or light line 16 lies in the sub-detection region 19. Based on the claimed method, this sub-detection region 19 is detected by the image detecting device in high resolution. The advantage of reducing the detected image to the sub-detection region 19 is, firstly, that the detection and reading speed of the image detecting device 10 is significantly higher than would be the case if detecting or reading the entire detection range 8. Furthermore, due to the smaller sub-detection region 19, the quantity of data to be processed by the analysis module is also reduced, thereby enabling a high processing speed to be obtained. This in turn enables the current bending angle to be determined on a very accurate and timely basis, thereby increasing the throughput rate of the bending machine.

By a high resolution in this context is meant that the region of the light pattern 13 or light line 16 is detected at least from the transition portion 9 with a resolution of at least 500 ppi. This resolution enables the course of the bending line in the region of the bending edge of the lower tool to be determined very accurately and very rapidly and from this the resultant bending angle being set and if necessary a rebounding movement that can be expected. Furthermore, since the image detecting device no longer has to be pivoted to obtain its relative orientation with respect to the lower tool or sheet so that it can be used for lower tools of differing widths, the accuracy that can be achieved and reproduced when determining the bending angle can be significantly increased.

The proposed method therefore results in an increase in processing speed and hence an increase in the throughput rate of sheets to be formed. At the same time, a long-term stability is achieved with the process of determining the bending angle due to the fact that a high accuracy can be achieved on a reproducible basis when determining the bending angle using a bending angle measuring device of a simple design.

Finally, it should be pointed out that the same parts described in the different embodiments are denoted by the same reference numbers and the same component names and the disclosures made throughout the description can be transposed in terms of meaning to same parts bearing the same reference numbers or same component names. Furthermore, the positions chosen for the purposes of the description, such as top, bottom, side, etc., relate to the drawing specifically being described and can be transposed in terms of meaning to a new position when another position is being described.

FIG. 3 illustrates another and optionally independent embodiment of the bending angle measuring method, the same reference numbers and component names being used to denote parts that are the same as those described with reference to the preceding drawings. To avoid unnecessary repetition, reference may be made to the more detailed description of the drawings given above.

The embodiments illustrated as examples represent possible variants of the bending angle measuring method, and it should be pointed out at this stage that the invention is not specifically limited to the variants specifically illustrated, and instead the individual variants may be used in different combinations with one another and these possible variations lie within the reach of the person skilled in this technical field given the disclosed technical teaching.

Furthermore, individual features or combinations of features from the different embodiments illustrated and described may be construed as independent inventive solutions or solutions proposed by the invention in their own right.

The objective underlying the independent inventive solutions may be found in the description.

All the figures relating to ranges of values in the description should be construed as meaning that they include any and all part-ranges, in which case, for example, the range of 1 to 10 should be understood as including all part-ranges starting from the lower limit of 1 to the upper limit of 10, all part-ranges starting with a lower limit of 1 or more and ending with an upper limit of 10 or less, e.g. 1 to 1.7, or 3.2 to 8.1 or 5.5 to 10.

Above all, the individual embodiments of the subject matter illustrated in FIGS. 1-4 constitute independent solutions proposed by the invention in their own right. The objectives and associated solutions proposed by the invention may be found in the detailed descriptions of these drawings.

For the sake of good order, finally, it should be pointed out that, in order to provide a clearer understanding of the set-up of the bending angle measuring method, it and the parts involved are illustrated to a certain extent out of scale and/or on an enlarged scale and/or on a reduced scale.

LIST OF REFERENCE NUMBERS

1 Bending machine
2 Bending tool arrangement
3 Upper tool
4 Lower tool
5 Sheet
6 Width
7 Bending angle measuring device
8 Detection range
9 Transition portion
10 Image detecting device
11 Lighting device
12 Die recess
13 Light pattern
14 Bottom face
15 Side wall
16 Light line
17 Longitudinal direction
18 Guide device
19 Sub-detection region

The invention claimed is:

1. A bending angle measuring method for measuring a bending angle in a bending machine, wherein the bending machine has a bending tool arrangement comprising at least an upper tool and a lower tool,
the method comprising:
placing a sheet to be formed in the bending tool arrangement;
emitting a light pattern using a lighting device of a bending angle measuring device onto a lateral surface of the lower tool and the sheet positioned in the bending tool arrangement;
detecting the light pattern on the lower tool and on the sheet by an image detecting device of the bending angle measuring device;
determining by an analysis module a bending angle from the light pattern detected by the image detecting device, the analysis module processing data from the light pattern to determine the bending angle;
determining using the analysis module a portion in a detected image by the image detecting device extending between the lower tool and the sheet; and
detecting, based on the portion, a region in a detection range of the image detecting device;
wherein the image detecting device comprises a high-resolution camera with a resolution of at least 500 ppi in the region;
and the bending angle is determined while carrying out a bending process.

2. The bending angle measuring method according to claim 1, wherein a light line is emitted by the lighting device.

3. The bending angle measuring method according to claim 1, wherein the portion is determined by finding a discontinuity of the geometry in the light pattern detected by the image detecting device.

4. The bending angle measuring method according to claim 1, wherein the portion is determined on the basis of a code of the lower tool that is stored or determined.

5. The bending angle measuring method according to claim 4, wherein a tool code applied to the lower tool is read by the image detecting device.

6. The bending angle measuring method according to claim 1, wherein the region is detected in high resolution.

7. The bending angle measuring method according to claim 1, wherein the bending angle measuring device is pushed along the lower tool.

* * * * *